(12) United States Patent
Zhao et al.

(10) Patent No.: US 10,257,514 B2
(45) Date of Patent: Apr. 9, 2019

(54) ADAPTIVE DEQUANTIZATION METHOD AND APPARATUS IN VIDEO CODING

(71) Applicant: Huawei Technologies Co., Ltd., Shenzhen (CN)

(72) Inventors: Yin Zhao, Hangzhou (CN); Haitao Yang, Shenzhen (CN); Zhuoyi Lv, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 134 days.

(21) Appl. No.: 15/408,585

(22) Filed: Jan. 18, 2017

(65) Prior Publication Data

US 2017/0127062 A1 May 4, 2017

Related U.S. Application Data

(63) Continuation of application No. PCT/CN2015/070905, filed on Jan. 16, 2015.

(30) Foreign Application Priority Data

Jul. 24, 2014 (CN) .......................... 2014 1 0355790

(51) Int. Cl.
*H04N 19/30* (2014.01)
*H04N 19/124* (2014.01)
(Continued)

(52) U.S. Cl.
CPC ......... *H04N 19/124* (2014.11); *H04N 19/126* (2014.11); *H04N 19/136* (2014.11);
(Continued)

(58) Field of Classification Search
CPC .. H04N 19/124; H04N 19/126; H04N 19/136; H04N 19/176; H04N 19/18;
(Continued)

(56) References Cited

U.S. PATENT DOCUMENTS 6,363,113 B1    3/2002   Faryar et al.
6,597,739 B1 *  7/2003   Li ........................ H04N 19/63
                                                       375/240.19
(Continued)

FOREIGN PATENT DOCUMENTS

CN    101039421 A    9/2007
CN    101103632 A    1/2008
(Continued)

OTHER PUBLICATIONS

Patil et al, Adaptive texture and color feature based color image compression (Year: 2013).*
(Continued)

*Primary Examiner* — Shan E Elahi
(74) *Attorney, Agent, or Firm* — Conley Rose, P.C.

(57) ABSTRACT

An adaptive dequantization method and apparatus in video coding includes, a statistical feature of a background area in which a current transform block is located is estimated using spatial neighborhood information, or temporal neighborhood information, or spatial neighborhood information and temporal neighborhood information of the transform block, a quantization adjustment factor for dequantization is adaptively derived, and dequantization processing is flexibly adjusted. Hence quantization adjustment information is transmitted in a bitstream, according to the method and the apparatus, and extra bit overheads are not required to transmit the quantization adjustment information, thereby further improving coding efficiency.

20 Claims, 3 Drawing Sheets

(51) Int. Cl.
*H04N 19/176* (2014.01)
*H04N 19/60* (2014.01)
*H04N 19/126* (2014.01)
*H04N 19/136* (2014.01)
*H04N 19/18* (2014.01)
*H04N 19/182* (2014.01)
*H04N 19/184* (2014.01)
*H04N 19/186* (2014.01)

(52) U.S. Cl.
CPC ........... *H04N 19/176* (2014.11); *H04N 19/18* (2014.11); *H04N 19/30* (2014.11); *H04N 19/60* (2014.11); *H04N 19/182* (2014.11); *H04N 19/184* (2014.11); *H04N 19/186* (2014.11)

(58) Field of Classification Search
CPC .. H04N 19/182; H04N 19/184; H04N 19/186; H04N 19/30; H04N 19/60
USPC ...................................... 375/240.03
See application file for complete search history.

(56) References Cited

U.S. PATENT DOCUMENTS

| | | | | |
|---|---|---|---|---|
| 6,937,659 | B1* | 8/2005 | Nguyen | H04N 19/503 348/397.1 |
| 7,680,191 | B2* | 3/2010 | Nguyen | H04N 19/503 375/240.19 |
| 8,467,626 | B2* | 6/2013 | Bhagavathy | G06T 5/50 382/260 |
| 9,740,886 | B2* | 8/2017 | Wang | G06F 21/76 |
| 2006/0274962 | A1* | 12/2006 | Chiu | H04N 5/142 382/275 |
| 2008/0187042 | A1 | 8/2008 | Jasinschi | |
| 2010/0054330 | A1* | 3/2010 | Chen | H04N 19/46 375/240.03 |
| 2010/0080289 | A1* | 4/2010 | Jeon | H04N 19/46 375/240.03 |
| 2012/0183053 | A1 | 7/2012 | Lu et al. | |
| 2013/0215971 | A1* | 8/2013 | Regunathan | H04N 19/122 375/240.18 |
| 2013/0322526 | A1 | 12/2013 | Aoki et al. | |
| 2014/0086313 | A1* | 3/2014 | Zheng | H04N 19/139 375/240.03 |
| 2014/0161177 | A1* | 6/2014 | Sim | H04N 19/70 375/240.03 |
| 2016/0198162 | A1 | 7/2016 | Zheng et al. | |

FOREIGN PATENT DOCUMENTS

| | | | |
|---|---|---|---|
| CN | 101325714 | A | 12/2008 |
| CN | 101677398 | A | 3/2010 |
| CN | 101771868 | A | 7/2010 |
| CN | 101888556 | A | 11/2010 |
| CN | 102223527 | A | 10/2011 |
| EP | 2317769 | A1 | 5/2011 |
| EP | 2685720 | A1 | 1/2014 |
| JP | 2008527827 | A | 7/2008 |
| JP | 2013507086 | A | 2/2013 |
| KR | 20120083368 | A | 7/2012 |
| WO | 2004104930 | A2 | 12/2004 |
| WO | 2006072894 | A2 | 7/2006 |
| WO | 2011043793 | A1 | 4/2011 |
| WO | 2012120888 | A1 | 9/2012 |

OTHER PUBLICATIONS

Kikuchi et al, Adaptive color space transforms for 4:4:4 video coding considering uncorrelated noise among color component (Year: 2016).*
Zhang et al, Adaptive color-space transform in HEVC screen content coding (Year: 2016).*
Yang, K., et al., "Perceptual Quantization for Predictive Coding of Images," Proceedings of 1999 International Conference on Image Processing, Oct. 24-28, 1999, pp. 381-384.
Foreign Communication From a Counterpart Application, Japanese Application No. 2017-503878, Japanese Office Action dated Jan. 9, 2018, 5 pages.
Foreign Communication From a Counterpart Application, Japanese Application No. 2017-503878, English Translation of Japanese Office Action dated Jan. 9, 2018, 6 pages.
Foreign Communication From a Counterpart Application, Korean Application No. 10-2017-7003914, Korean Office Action dated Nov. 21, 2017, 6 pages.
Foreign Communication From a Counterpart Application, Korean Application No. 10-2017-7003914, English Translation of Korean Office Action dated Nov. 21, 2017, 5 pages.
Machine Translation and Abstract of Chinese Publication No. CN101771868, dated Jul. 7, 2010, 14 pages.
Machine Translation and Abstract of Chinese Publication No. CN101888556, dated Nov. 17, 2010, 32 pages.
Machine Translation and Abstract of Chinese Publication No. CN102223527, dated Oct. 19, 2011, 17 pages.
Wang, S., et al., "Perceptual Video Coding Based on SSIM-Inspired Divisive Normalization," IEEE Transactions on Image Processing, vol. 22, No. 4, Apr. 2013, pp. 1418-1429.
"Series H: Audiovisual and Multimedia Systems, Infrastructure of audiovisual services—Coding of moving video, Advanced video coding for generic audiovisual services," ITU-T, H.264, Feb. 2014, 790 pages.
"Series H: Audiovisual and Multimedia Systems, Infrastructure of audiovisual services—Coding of moving video, High efficiency video coding," ITU-T, H.265, Apr. 2013, 317 pages.
Foreign Communication From a Counterpart Application, European Application No. 15824496.2, Partial Supplementary European Search Report dated May 22, 2017, 9 pages.
Foreign Communication From a Counterpart Application, PCT Application No. PCT/CN2015/070905, English Translation of International Search Report dated Apr. 29, 2015, 2 pages.
Foreign Communication From a Counterpart Application, PCT Application No. PCT/CN2015/070905, English Translation of Written Opinion dated Apr. 29, 2015, 10 pages.

* cited by examiner

ADAPTIVE DEQUANTIZATION METHOD AND APPARATUS IN VIDEO CODING

CROSS-REFERENCE TO RELATED APPLICATIONS

This application is a continuation of International Patent Application No. PCT/CN2015/070905 filed on Jan. 16, 2015, which claims priority to Chinese Patent Application No. 201410355790.5, filed on Jul. 24, 2014. The disclosures of the aforementioned applications are hereby incorporated by reference in their entireties.

TECHNICAL FIELD

The present disclosure relates to the data processing field, and in particular, to an adaptive dequantization method and apparatus in video coding.

BACKGROUND

Currently, there are multiple video coding technologies, for example, video coding standards such as H.264/advanced video coding (AVC), H.265/high efficiency video coding (HEVC), and Audio Video Coding Standard (AVS). The foregoing video coding standards generally use a hybrid coding framework, and the hybrid coding framework mainly includes the phases, prediction, transform, quantization, entropy coding, and the like.

In the prediction phase, a reconstructed pixel of a coded area is used to generate a predicted pixel for an original pixel corresponding to a current code block. Two main types of prediction manners are included, intra-prediction and inter-prediction. For the intra-prediction, a reconstructed pixel of a spatial neighborhood of the current code block in a current code image is used to generate the predicted pixel of the current code block, for example, horizontal, vertical or other multi-directional prediction in the H.264/AVC, and a prediction manner based on template matching and intra-motion compensation. For the inter-prediction, a reconstructed pixel, in one or more coded images, corresponding to the current code block is used as the predicted pixel of the current code block, for example, prediction based on motion compensation. The inter-prediction includes two forms, unidirectional prediction and bidirectional prediction. For the unidirectional prediction, a reconstructed pixel in one coded image is used to generate the predicted pixel of the current code block, and for the bidirectional prediction, reconstructed pixels in two coded images are used to generate the predicted pixel of the current code block.

A pixel value difference between an original pixel and a predicted pixel is referred to as a residual. To improve coding efficiency of the residual, generally, the residual is first transformed and converted into a transform coefficient. Common transform includes discrete cosine transform (DCT), discrete sine transform (DST), wavelet transform, and the like. Afterwards, quantization processing is performed on the transform coefficient, for example, by means of vector quantization or scalar quantization. Then, a quantized transform coefficient and encoding mode information (for example, a code block size, a prediction mode, and a motion vector) are converted into a bitstream by means of entropy coding processing. A common entropy coding method includes arithmetic coding, variable length coding (VLC), fixed length coding, run-length coding, and the like.

The transform coefficient may be quantized in a scalar quantization manner. If an $i^{th}$ transform coefficient in N transform coefficients of a residual of the current code block is denoted as $C(i)$ ($1 \leq i \leq N$, N is associated with a transform block size and is usually 16, 64, 1024, or the like), the quantized transform coefficient $Q(i)$ is:

$$Q(i) = \text{sign}\{C(i)\} \cdot \text{round}\left\{\frac{|C(i)|}{Qs(i)} + o1(i)\right\},$$

where sign{X} represents a symbol of X, that is, $$\text{sign}\{X\} = \begin{cases} 1, & X \geq 0 \\ -1, & X < 0 \end{cases}, \text{round}\{X\}$$

is a rounding operation and may be generally one of rounding down, rounding off, or rounding up, |X| represents an absolute value or an amplitude of X, $Qs(i)$ represents a quantization step corresponding to the transform coefficient $C(i)$, and $o1(i)$ is a rounding offset.

Video decoding is a process of converting a bitstream into a video image, and includes several main phases such as entropy decoding, prediction, dequantization, and inverse transform. First, the bitstream is parsed by means of entropy decoding processing to obtain encoding mode information and a quantized transform coefficient. Then, on one hand, a predicted pixel is obtained using the encoding mode information and a decoded reconstructed pixel. On the other hand, dequantization is performed on the quantized transform coefficient to obtain a reconstructed transform coefficient, and inverse transform is performed on the reconstructed transform coefficient to obtain reconstructed residual information. Afterwards, the reconstructed residual information is added to the predicted pixel to obtain a reconstructed pixel in order to restore the video image.

Dequantization is performed on the quantized transform coefficient $Q(i)$ to obtain the reconstructed transform coefficient $R(i)$, which may be described as:

$$R(i)=\text{sign}\{Q(i)\}\cdot\text{round}\{Q(i)\cdot Qs(i)+o2(i)\} \quad \text{(Formula 1)},$$

where $Qs(i)$ may be a floating-point number, and $o2(i)$ is a rounding offset. Generally, to avoid using a floating-point operation, floating-point multiplication is approximately replaced with a manner of integer addition and shifting. For example, in the H.265/HEVC, the dequantization process described in Formula 1 is approximated by:

$$R(i)=\text{sign}\{Q(i)\}\cdot(Q(i)\cdot Qs'(i)+(1<<(bd\text{shift}-1)))>>bd\text{shift} \quad \text{(Formula 2)},$$

where bdshift is a shifting parameter, $Qs'(i)$ is an integer, and $Qs'(i)/2^{bdshift}$ approximates to the quantization step $Qs(i)$ in (1). In this case, $o2(i)=0.5$, and a rounding manner is rounding down. $Qs'(i)$ is jointly determined by a level scale $l(i)$ and a scaling factor $m(i)$:

$$Qs'(i)=m(i)\cdot l(i) \quad \text{(Formula 3)},$$

where $l(i)$ is a function of a quantization parameter (QP), that is, $$l(i)=\text{levelScale}[QP(i)\%6]<<\lfloor QP(i)/6 \rfloor \quad \text{(Formula 4)},$$

where a level scaling list levelScale[k]={40,45,51,57,64,72}, where k=0, 1, . . . , 5, and $\lfloor QP(i)/6 \rfloor$ represents rounding after QP(i) is divided by 6, and % is a REM operation.

Generally, the dequantization is directly associated with the quantization step, and the quantization step is affected by the QP, the scaling factor, and the level scaling list. The quantization step may be adjusted in multiple manners. For example, each level of QP corresponds to a quantization step when the scaling factor and the level scaling list are fixed. The H.264/AVC and the H.265/HEVC stipulate 52 levels of QPs. Therefore, the quantization step may be adjusted by changing the QP. For another example, the quantization step may be changed by adjusting the scaling factor. Typically, one of multiple scaling factor matrices, also referred as quantization matrices, may be selected to determine the scaling factor. Although different data is changed in the foregoing two examples, the quantization step is adjusted in essence.

For lossy encoding, a reconstructed pixel and an original pixel may be different, and a value difference between the two is referred to as distortion. Due to multiple visual masking effects such as a luminance masking effect and a contrast masking effect, distortion intensity observed by human eyes is closely associated with a feature of a background in which the distortion is located. That is, sensitivity of the human eyes to distortion is associated with background luminance and background contrast of a location of the distortion. Generally, the distortion sensitivity and the background luminance present a U-shaped curvilinear relationship, and the distortion sensitivity and a variance or a standard deviation of the background present a monotonically decreasing relationship. In the video coding, with reference to the foregoing visual features, the quantization step is increased in an area of visual insensitivity to distortion (that is, an area of relatively small distortion sensitivity), and the quantization step is reduced in an area of visual sensitivity to distortion. Therefore, in comparison with a uniform quantization step, coding distortion allocation can be more suitable for visual perception of the human eyes, and subjective quality is improved at a same bit rate, that is, coding efficiency is improved.

A method for adjusting a quantization step is as follows.

At an encoder, a video sequence is analyzed, a QP corresponding to a transformation coefficient of each code block is determined, and the QP or an offset (delta QP) of the QP relative to a slice QP is written into a bitstream. At a decoder, a quantization step of each code block is accordingly adjusted according to the QP obtained by means of parsing.

In the foregoing existing technical solutions, the QP is decided at the encoder and QP information is transmitted in the bitstream such that the decoder learns of a quantization step adjustment value of each code block, to implement adaptive quantization step adjustment. However, side information corresponding to the QP limits coding efficiency improvement to some extent.

SUMMARY

The present disclosure provides an adaptive dequantization method and apparatus in video coding. According to the method and the apparatus that are provided in the present disclosure, a problem that side information corresponding to a QP limits coding efficiency improvement to some extent is resolved.

According to a first aspect, an adaptive dequantization method in video coding is provided, where the method includes determining an image area, in a current decoded image, corresponding to a first transform coefficient set, where the first transform coefficient set includes N transform coefficients, the transform coefficient is a transform coefficient of any color space component in the current decoded image, and N is a positive integer, obtaining decoded pixel information of the image area, where the decoded pixel information includes spatial neighborhood pixel information of the image area, calculating a quantization adjustment factor according to the decoded pixel information, and performing dequantization on the first transform coefficient set according to the quantization adjustment factor to obtain a second transform coefficient set.

With reference to the first aspect, in a first possible implementation manner, the decoded pixel information further includes temporal neighborhood pixel information of the image area and/or pixel information of the image area.

With reference to either the first aspect or the first possible implementation manner of the first aspect, in a second possible implementation manner, calculating a quantization adjustment factor according to the decoded pixel information includes calculating the quantization adjustment factor according to a first function $f_1(P_{avg})$ of a pixel average $P_{avg}$, where the pixel average $P_{avg}$ is an average of luminance components of multiple pixels corresponding to the decoded pixel information or an average of same color space components of the multiple pixels, and the color space component is a color space component corresponding to the first transform coefficient set.

With reference to either the first aspect or the first possible implementation manner of the first aspect, in a third possible implementation manner, calculating a quantization adjustment factor according to the decoded pixel information includes calculating the quantization adjustment factor according to a second function $f_2(P_{var})$ of a pixel variance $P_{var}$, where the pixel variance $P_{var}$ is a variance of luminance components of multiple pixels corresponding to the decoded pixel information or a variance of same color space components of the multiple pixels, and the color space component is a color space component corresponding to the first transform coefficient set.

With reference to either the first aspect or the first possible implementation manner of the first aspect, in a fourth possible implementation manner, calculating a quantization adjustment factor according to the decoded pixel information includes calculating the quantization adjustment factor according to a combined function $f_1(P_{avg}) \cdot f_2(P_{var})$ of a pixel variance $P_{var}$ and a pixel average $P_{avg}$, where the pixel average $P_{avg}$ is an average of luminance components of multiple pixels in the decoded pixel information or an average of same color space components of the multiple pixels, and the pixel variance $P_{var}$ is a variance of the luminance components of the multiple pixels or a variance of the same color space components of the multiple pixels, and the color space component is a color space component corresponding to the first transform coefficient set.

With reference to either the first aspect or the first possible implementation manner of the first aspect, in a fifth possible implementation manner, calculating a quantization adjustment factor according to the decoded pixel information includes calculating the quantization adjustment factor according to a third function $f_3(P_{max}-P_{min})$ of a difference between a maximum pixel value $P_{max}$ and a minimum pixel value $P_{min}$, where the maximum pixel value $P_{max}$ is a maximum value of luminance components of multiple pixels corresponding to the decoded pixel information or a maximum value of same color space components of the multiple pixels, and the minimum pixel value is a minimum value of the luminance components of the multiple pixels or a minimum value of the same space components of the multiple pixels, and the color space component is a color space component corresponding to the first transform coefficient set.

With reference to any one of the first aspect or the first to the fifth possible implementation manners of the first aspect, in a sixth possible implementation manner, performing dequantization processing on the first transform coefficient set according to the quantization adjustment factor to obtain a second transform coefficient set includes determining, according to a preset first correspondence, a target level scaling list corresponding to the quantization adjustment factor, where the first correspondence is a correspondence between quantization adjustment factors and level scaling lists, and performing dequantization on the first transform coefficient set according to the target level scaling list to obtain the second transform coefficient set.

With reference to any one of the first aspect or the first to the fifth possible implementation manners of the first aspect, in a seventh possible implementation manner, performing dequantization processing on the first transform coefficient set according to the quantization adjustment factor to obtain a second transform coefficient set includes determining, according to a preset second correspondence, a target quantization matrix corresponding to the quantization adjustment factor, where the second correspondence is a correspondence between quantization adjustment factors and quantization matrices, and performing dequantization on the first transform coefficient set according to the target quantization matrix to obtain the second transform coefficient set.

With reference to any one of the first aspect or the first to the fifth possible implementation manners of the first aspect, in an eighth possible implementation manner, performing dequantization processing on the first transform coefficient set according to the quantization adjustment factor to obtain a second transform coefficient set includes obtaining, from a signal corresponding to the current decoded image, a first QP corresponding to the first transform coefficient set, determining a target QP offset according to the quantization adjustment factor, and adding the target QP offset to the first QP to obtain a second QP, and determining a level scale according to the second QP, and performing dequantization on the first transform coefficient set using the level scale, to obtain the second transform coefficient set.

With reference to any one of the first aspect or the first to the fifth possible implementation manners of the first aspect, in a ninth possible implementation manner, performing dequantization processing on the first transform coefficient set according to the quantization adjustment factor to obtain a second transform coefficient set includes obtaining, from a signal corresponding to the current decoded image, a first quantization step corresponding to the first transform coefficient set, and performing scaling on the first quantization step using the quantization adjustment factor to obtain a second quantization step, and performing dequantization on the first transform coefficient set using the second quantization step to obtain the second transform coefficient set.

With reference to any one of the first aspect or the first to the fifth possible implementation manners of the first aspect, in a tenth possible implementation manner, performing dequantization processing on the first transform coefficient set according to the quantization adjustment factor to obtain a second transform coefficient set includes obtaining, from a signal corresponding to the current decoded image, a first quantization step corresponding to the first transform coefficient set, performing dequantization on the coefficient in the first transform coefficient set using the first quantization step to obtain a coefficient in a third transform coefficient set, and performing scaling on the coefficient in the third transform coefficient set using the quantization adjustment factor obtained by means of calculation in order to obtain the second transform coefficient set.

According to a second aspect, an adaptive dequantization method in video coding is provided, where the method includes determining an image area X, in a current decoded image, corresponding to a first transform coefficient set, where the first transform coefficient set includes N transform coefficients, the transform coefficient is a transform coefficient of any color space component in the current decoded image, and N is a positive integer, obtaining temporal neighborhood pixel information of the image area X, calculating a quantization adjustment factor according to a first average $P_{avg}$ and a first variance $P_{var}$, where the first average $P_{avg}$ is an average of luminance components of multiple pixels in the decoded pixel information or an average of same color space components of the multiple pixels, and the first variance $P_{var}$ is a variance of the luminance components of the multiple pixels or a variance of the same color space components of the multiple pixels, and the color space component is a color space component corresponding to the first transform coefficient set, and performing dequantization processing on the first transform coefficient set according to the quantization adjustment factor to obtain a second transform coefficient set.

With reference to the second aspect, in a first possible implementation manner, calculating a quantization adjustment factor according to a first average $P_{avg}$ and a first variance $P_{var}$ includes calculating the quantization adjustment factor according to a combined function $f_1(P_{avg}) \cdot f_2(P_{var})$ of the first average $P_{avg}$ and the first variance $P_{var}$.

With reference to either the second aspect or the first possible implementation manner of the second aspect, in a second possible implementation manner, performing dequantization processing on the first transform coefficient set according to the quantization adjustment factor to obtain a second transform coefficient set includes determining, according to a preset first correspondence, a target level scaling list corresponding to the quantization adjustment factor, where the first correspondence is a correspondence between quantization adjustment factors and level scaling lists, and performing dequantization on the first transform coefficient set according to the target level scaling list to obtain the second transform coefficient set.

With reference to either the second aspect or the first possible implementation manner of the second aspect, in a third possible implementation manner, performing dequantization processing on the first transform coefficient set according to the quantization adjustment factor to obtain a second transform coefficient set includes determining, according to a preset second correspondence, a target quantization matrix corresponding to the quantization adjustment factor, where the second correspondence is a correspondence between quantization adjustment factors and quantization matrices, and performing dequantization on the first transform coefficient set according to the target quantization matrix to obtain the second transform coefficient set.

With reference to either the second aspect or the first possible implementation manner of the second aspect, in a fourth possible implementation manner, performing dequantization processing on the first transform coefficient set according to the quantization adjustment factor to obtain a second transform coefficient set includes obtaining, from a signal corresponding to the current decoded image, a first QP corresponding to the first transform coefficient set, determining a target QP offset according to the quantization adjustment factor, and adding the target QP offset to the first QP to obtain a second QP, and determining a level scale according to the second QP, and performing dequantization on the first transform coefficient set using the level scale, to obtain the second transform coefficient set.

With reference to either the second aspect or the first possible implementation manner of the second aspect, in a fifth possible implementation manner, performing dequantization processing on the first transform coefficient set according to the quantization adjustment factor to obtain a second transform coefficient set includes obtaining, from a signal corresponding to the current decoded image, a first quantization step corresponding to the first transform coefficient set, and performing scaling on the first quantization step using the quantization adjustment factor to obtain a second quantization step, and performing dequantization on the first transform coefficient set using the second quantization step to obtain the second transform coefficient set.

With reference to either the second aspect or the first possible implementation manner of the second aspect, in a sixth possible implementation manner, performing dequantization processing on the first transform coefficient set according to the quantization adjustment factor to obtain a second transform coefficient set includes obtaining, from a signal corresponding to the current decoded image, a first quantization step corresponding to the first transform coefficient set, performing dequantization on the coefficient in the first transform coefficient set using the first quantization step to obtain a coefficient in a third transform coefficient set, and performing scaling on the coefficient in the third transform coefficient set using the quantization adjustment factor obtained by means of calculation in order to obtain the second transform coefficient set.

According to a third aspect, an adaptive dequantization apparatus in video coding is provided, where the apparatus includes a determining unit configured to determine an image area, in a current decoded image, corresponding to a first transform coefficient set, where the first transform coefficient set includes N transform coefficients, the transform coefficient is a transform coefficient of any color space component in the current decoded image, and N is a positive integer, an obtaining unit configured to obtain decoded pixel information of the image area, where the decoded pixel information includes spatial neighborhood pixel information of the image area, a calculation unit configured to calculate a quantization adjustment factor according to the decoded pixel information, and a dequantization unit configured to perform dequantization on the first transform coefficient set according to the quantization adjustment factor to obtain a second transform coefficient set.

With reference to the third aspect, in a first possible implementation manner, the obtaining unit is further configured to obtain temporal neighborhood pixel information of the image area and/or pixel information of the image area from the decoded pixel information.

With reference to either the third aspect or the first possible implementation manner of the third aspect, in a second possible implementation manner, the calculation unit is further configured to calculate the quantization adjustment factor according to a first function $f_1(P_{avg})$ of a pixel average $P_{avg}$, where the pixel average $P_{avg}$ is an average of luminance components of multiple pixels corresponding to the decoded pixel information or an average of same color space components of the multiple pixels, and the color space component is a color space component corresponding to the first transform coefficient set.

With reference to either the third aspect or the first possible implementation manner of the third aspect, in a third possible implementation manner, the calculation unit is further configured to calculate the quantization adjustment factor according to a second function $f_2(P_{var})$ of a pixel variance $P_{var}$, where the pixel variance $P_{var}$ is a variance of luminance components of multiple pixels corresponding to the decoded pixel information or a variance of same color space components of the multiple pixels, and the color space component is a color space component corresponding to the first transform coefficient set.

With reference to either the third aspect or the first possible implementation manner of the third aspect, in a fourth possible implementation manner, the calculation unit is further configured to calculate the quantization adjustment factor according to a combined function $f_1(P_{avg}) \cdot f_2(P_{var})$ of a pixel variance $P_{var}$ and a pixel average $P_{avg}$, where the pixel average $P_{avg}$ is an average of luminance components of multiple pixels in the decoded pixel information or an average of same color space components of the multiple pixels, and the pixel variance $P_{var}$ is a variance of the luminance components of the multiple pixels or a variance of the same color space components of the multiple pixels, and the color space component is a color space component corresponding to the first transform coefficient set.

With reference to either the third aspect or the first possible implementation manner of the third aspect, in a fifth possible implementation manner, the calculation unit is further configured to calculate the quantization adjustment factor according to a third function $f_3(P_{max}-P_{min})$ of a difference between a maximum pixel value $P_{max}$ and a minimum pixel value $P_{min}$, where the maximum pixel value $P_{max}$ is a maximum value of luminance components of multiple pixels corresponding to the decoded pixel information or a maximum value of same color space components of the multiple pixels, and the minimum pixel value is a minimum value of the luminance components of the multiple pixels or a minimum value of the same space components of the multiple pixels, and the color space component is a color space component corresponding to the first transform coefficient set.

With reference to any one of the third aspect or the first to the fifth possible implementation manners of the third aspect, in a sixth possible implementation manner, the dequantization unit is further configured to determine, according to a preset first correspondence, a target level scaling list corresponding to the quantization adjustment factor, where the first correspondence is a correspondence between quantization adjustment factors and level scaling lists, and perform dequantization on the first transform coefficient set according to the target level scaling list to obtain the second transform coefficient set.

With reference to any one of the third aspect or the first to the fifth possible implementation manners of the third aspect, in a seventh possible implementation manner, the dequantization unit is further configured to determine, according to a preset second correspondence, a target quantization matrix corresponding to the quantization adjustment factor, where the second correspondence is a correspondence between quantization adjustment factors and quantization matrices, and perform dequantization on the first transform coefficient set according to the target quantization matrix to obtain the second transform coefficient set.

With reference to any one of the third aspect or the first to the fifth possible implementation manners of the third aspect, in an eighth possible implementation manner, the dequantization unit is further configured to obtain, from a signal corresponding to the current decoded image, a first QP corresponding to the first transform coefficient set, determine a target QP offset according to the quantization adjustment factor, and add the target QP offset to the first QP to obtain a second QP, and determine a level scale according to the second QP, and perform dequantization on the first transform coefficient set using the level scale, to obtain the second transform coefficient set.

With reference to any one of the third aspect or the first to the fifth possible implementation manners of the third aspect, in a ninth possible implementation manner, the dequantization unit is further configured to obtain, from a signal corresponding to the current decoded image, a first quantization step corresponding to the first transform coefficient set, and perform scaling on the first quantization step using the quantization adjustment factor to obtain a second quantization step, and perform dequantization on the first transform coefficient set using the second quantization step to obtain the second transform coefficient set.

With reference to any one of the third aspect or the first to the fifth possible implementation manners of the third aspect, in a tenth possible implementation manner, the dequantization unit is further configured to obtain, from a signal corresponding to the current decoded image, a first quantization step corresponding to the first transform coefficient set, perform dequantization on the coefficient in the first transform coefficient set using the first quantization step to obtain a coefficient in a third transform coefficient set, and perform scaling on the coefficient in the third transform coefficient set using the quantization adjustment factor obtained by means of calculation in order to obtain the second transform coefficient set.

According to a fourth aspect, an adaptive dequantization apparatus in video coding is provided, where the apparatus includes a first determining unit configured to determine an image area X, in a current decoded image, corresponding to a first transform coefficient set, where the first transform coefficient set includes N transform coefficients, the transform coefficient is a transform coefficient of any color space component in the current decoded image, and N is a positive integer, a first obtaining unit configured to obtain temporal neighborhood pixel information of the image area X, a first calculation unit configured to calculate a quantization adjustment factor according to a first average $P_{avg}$ and a first variance $P_{var}$, where the first average $P_{avg}$ is an average of luminance components of multiple pixels in the decoded pixel information or an average of same color space components of the multiple pixels, and the first variance $P_{var}$ is a variance of the luminance components of the multiple pixels or a variance of the same color space components of the multiple pixels, and the color space component is a color space component corresponding to the first transform coefficient set, and a first dequantization unit configured to perform dequantization processing on the first transform coefficient set according to the quantization adjustment factor to obtain a second transform coefficient set.

With reference to the fourth aspect, in a first possible implementation manner, the first calculation unit is further configured to calculate the quantization adjustment factor according to a combined function $f_1(P_{avg}) \cdot f_2(P_{var})$ of the first average $P_{avg}$ and the first variance $P_{var}$.

With reference to either the fourth aspect or the first possible implementation manner of the fourth aspect, in a second possible implementation manner, the first dequantization unit is further configured to determine, according to a preset first correspondence, a target level scaling list corresponding to the quantization adjustment factor, where the first correspondence is a correspondence between quantization adjustment factors and level scaling lists, and perform dequantization on the first transform coefficient set according to the target level scaling list to obtain the second transform coefficient set.

With reference to either the fourth aspect or the first possible implementation manner of the fourth aspect, in a third possible implementation manner, the first dequantization unit is further configured to determine, according to a preset second correspondence, a target quantization matrix corresponding to the quantization adjustment factor, where the second correspondence is a correspondence between quantization adjustment factors and quantization matrices, and perform dequantization on the first transform coefficient set according to the target quantization matrix to obtain the second transform coefficient set.

With reference to either the fourth aspect or the first possible implementation manner of the fourth aspect, in a fourth possible implementation manner, the first dequantization unit is further configured to obtain, from a signal corresponding to the current decoded image, a first QP corresponding to the first transform coefficient set, determine a target QP offset according to the quantization adjustment factor, and add the target QP offset to the first QP to obtain a second QP, and determine a level scale according to the second QP, and perform dequantization on the first transform coefficient set using the level scale, to obtain the second transform coefficient set.

With reference to either the fourth aspect or the first possible implementation manner of the fourth aspect, in a fifth possible implementation manner, the first dequantization unit is further configured to obtain, from a signal corresponding to the current decoded image, a first quantization step corresponding to the first transform coefficient set, and perform scaling on the first quantization step using the quantization adjustment factor to obtain a second quantization step, and perform dequantization on the first transform coefficient set using the second quantization step to obtain the second transform coefficient set.

With reference to either the fourth aspect or the first possible implementation manner of the fourth aspect, in a sixth possible implementation manner, the first dequantization unit is further configured to obtain, from a signal corresponding to the current decoded image, a first quantization step corresponding to the first transform coefficient set, perform dequantization on the coefficient in the first transform coefficient set using the first quantization step to obtain a coefficient in a third transform coefficient set, and perform scaling on the coefficient in the third transform coefficient set using the quantization adjustment factor obtained by means of calculation in order to obtain the second transform coefficient set.

One or two of the foregoing technical solutions have at least the following technical effects.

According to the solutions provided in the embodiments of the present disclosure, a statistical feature of a background area in which a current transform block is located is estimated using spatial neighborhood information of the transform block, a quantization adjustment factor for dequantization is adaptively derived, and dequantization processing is flexibly adjusted. According to the adaptive quantization method in the solutions provided in the embodiments of the present disclosure, quantization distortion intensity can be more suitable for visual perception of human eyes, thereby improving coding efficiency.

DESCRIPTION OF EMBODIMENTS

In other approaches, a QP is decided at an encoder and QP information is transmitted in a bitstream such that a decoder learns of a quantization step adjustment value of each code block, implementing adaptive quantization step adjustment. However, side information corresponding to the QP limits coding efficiency improvement to some extent. Therefore, to resolve the problem, embodiments of the present disclosure provide an adaptive dequantization method in video coding, and the method includes determining an image area, in a current decoded image, corresponding to a first transform coefficient set, where the first transform coefficient set includes N transform coefficients, the transform coefficient is a transform coefficient of any color space component in the current decoded image, and N is a positive integer, obtaining decoded pixel information of the image area, where the decoded pixel information includes spatial neighborhood pixel information of the image area, calculating a quantization adjustment factor according to the decoded pixel information, and performing dequantization on the first transform coefficient set according to the quantization adjustment factor to obtain a second transform coefficient set.

According to solutions provided in the embodiments of the present disclosure, a statistical feature of a background area in which a current transform block is located is estimated using spatial neighborhood information of the transform block, a quantization adjustment factor is adaptively derived, and dequantization processing is flexibly adjusted. On one hand, according to the adaptive quantization method of the present disclosure, quantization distortion intensity can be more suitable for visual perception of human eyes, thereby improving coding efficiency.

On the other hand, in comparison with the existing solution in which the quantization adjustment information is transmitted in the bitstream, according to the solutions provided in the embodiments of the present disclosure, extra bit overheads are not required to transmit the quantization adjustment information, thereby further improving the coding efficiency.

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
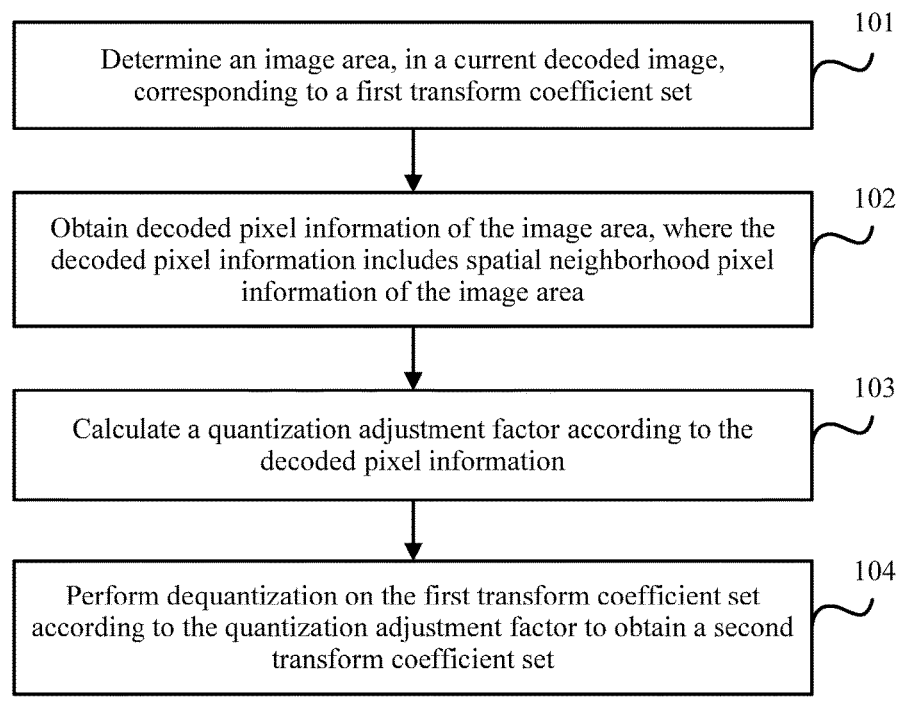
FIG. 1 is a schematic flowchart of an adaptive dequantization method in video coding according to an embodiment of the present disclosure.

As shown in FIG. 1, an embodiment of the present disclosure provides an adaptive dequantization method in video coding, and the method includes the following steps.

Step 101: Determine an image area, in a current decoded image, corresponding to a first transform coefficient set, where the first transform coefficient set includes N transform coefficients, the transform coefficient is a transform coefficient of any color space component in the current decoded image, and N is a positive integer.

In this embodiment of the present disclosure, the first transform coefficient set may include the N transform coefficients $A(i)$, $i=1,2,\ldots,N$, and N is the positive integer, for example, N=1, 2, 4, 16, 32, 50, 64, 81, 128, 256, 512, or 1024. The transform coefficient $A(i)$ is a transform coefficient of any color space component in the current decoded image, for example, a transform coefficient of a luminance component, a transform coefficient of a chrominance component, and a transform coefficient of any one of RGB components (for example, an R component).

The image area corresponding to the first transform coefficient set is an area, in the current decoded image, corresponding to the first transform coefficient set. For example, in a hybrid coding framework corresponding to an H.264/AVC or H.265/HEVC standard, the image area corresponding to the first transform coefficient set is an image area covered by a transform block or a transform unit corresponding to the first transform coefficient set. In this embodiment of the present disclosure, the first transform coefficient set may include all transform coefficients of one transform block, or may include some transform coefficients of one transform block, for example, a direct current coefficient, or a group of low frequency coefficients, or a group of high frequency coefficients, or a direct current coefficient and a group of high frequency coefficients, or the first several coefficients in a specific coefficient scanning sequence in one transform block.

Step 102: Obtain decoded pixel information of the image area, where the decoded pixel information includes spatial neighborhood pixel information of the image area.

In this embodiment of the present disclosure, the spatial neighborhood pixel information refers to information about a pixel in a same frame of decoded image as the image area, and a location and a range of a neighboring pixel are adaptively adjusted according to different decoding conditions.

The spatial neighborhood pixel information may include a reconstructed value of at least one pixel in a spatial neighborhood of an image area X and/or at least one intra-predicted pixel that is of an image area X and that is generated according to pixel information in a spatial neighborhood of the image area X.

When the decoded pixel information is spatial neighborhood pixel information, the spatial neighborhood pixel information may include M pixels, M is a positive integer, and the spatial neighborhood pixel information includes at least one of the following pixel information.

Figure 2:
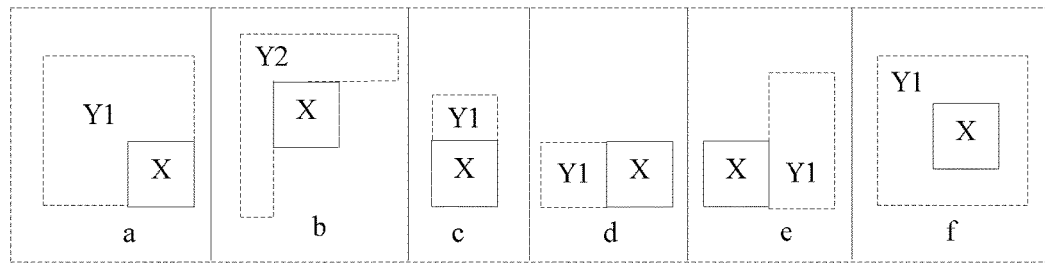
FIG. 2 is a schematic diagram of a first spatial neighborhood pixel of an image area according to an embodiment of the present disclosure.

(1) Pixel information in a spatial neighborhood Y1 (several optional examples of the spatial neighborhood Y1 are shown in FIG. 2) of the image area X, including a reconstructed value of at least one pixel in the spatial neighborhood Y1. A specific case of the spatial neighborhood Y1 may be as follows.

The spatial neighborhood Y1 is an area adjacent to at least one border of a top, bottom, left, or right border of X, for example, an L-shaped area adjacent to both the left border and the top border of X (as shown in an example a and an example b in FIG. 2), or a rectangular area adjacent to the top border, the left border or the right border of the area X (as shown in an example c, an example d, and an example e in FIG. 2), or a part of area obtained after X is removed from a rectangular area including X (as shown in an example f in FIG. 2).

Figure 3:
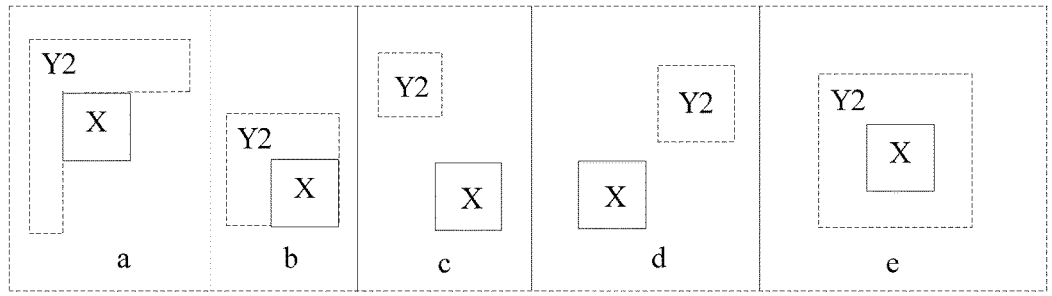
FIG. 3 is a schematic diagram of a second spatial neighborhood pixel of an image area according to an embodiment of the present disclosure.

(2) The at least one intra-predicted pixel that is of the image area X and that is generated according to the pixel information in the spatial neighborhood of the image area X, further including predicted pixel information that is of the image area X and that is generated according to pixel information in a spatial neighborhood Y2 (several optional examples of the spatial neighborhood Y2 are shown in FIG. 3) of the image area X in an intra-prediction manner.

The intra-prediction manner is, for example, a direction-based intra-prediction mode, a DC prediction mode, and a planar prediction mode in the H.265/HEVC, and is, for another example, a manner such as a template matching method or intra-motion compensation.

The predicted pixel information of the image area X includes the at least one intra-predicted pixel of the image area X. The spatial neighborhood Y2 may be a part of the spatial neighborhood Y1, or may include an area except the spatial neighborhood Y1. For example, the spatial neighborhood Y2 may be an L-shaped area adjacent to both the left border and the top border of X (as shown in an example a and an example b in FIG. 3), or a rectangular area with a same size as X in a left or top area of X (as shown in an example c and an example d in FIG. 3), or a part of area obtained after X is removed from a rectangular area including X (as shown in an example e in FIG. 3).

Step 103: Calculate a quantization adjustment factor according to the decoded pixel information.

In this embodiment of the present disclosure, to achieve an adaptive dequantization effect, during dequantization, the quantization adjustment factor is calculated using parameters that may reflect some features of the decoded pixel information. In this embodiment of the present disclosure, the quantization adjustment factor may be calculated using a parameter reflecting a statistical feature of a decoded pixel, which further includes the following.

The statistical feature of the decoded pixel information refers to a value result obtained after pixel values of multiple pixels in the decoded pixel information are statistically analyzed, and the parameter with the statistical feature includes at least one of a pixel average $P_{avg}$, a pixel variance $P_{var}$, a maximum pixel value $P_{max}$, or a minimum pixel value $P_{min}$.

Step 104: Perform dequantization on the first transform coefficient set according to the quantization adjustment factor to obtain a second transform coefficient set.

To obtain more decoded pixel information for a more accurate and stable statistical feature calculation, the decoded pixel information in this embodiment of the present disclosure may further include temporal neighborhood pixel information of the image area X. The temporal neighborhood pixel information is pixel information of one or more frames of coded image in front of or behind an image in which the current decoded image is located, and the temporal neighborhood pixel information includes at least one of the following two.

(1) A reconstructed value of at least one pixel in a corresponding area of the image area X in another coded image or a sub-pixel accuracy reconstructed value obtained by means of interpolation filtering.

The corresponding area may be obtained according to a motion vector of the image area X and by means of common motion compensation processing. Particularly, the motion vector may be rounded to an integer value and then motion compensation is performed to obtain the corresponding area when the motion vector of the image area X is sub-pixel accuracy.

(2) A weighted average of reconstructed values of pixels, at at least one location in corresponding areas in at least two coded images, corresponding to the image area X.

For example, when two coded images are used, corresponding areas in the two coded images are separately found using the motion vector of the image area X. Pixels at a same location in the two corresponding areas are corresponding pixels, a weighted average of a group of corresponding pixels is used as a pixel in the temporal neighborhood pixel information, and the same location may be an integer pixel location or a sub-pixel location.

In this embodiment of the present disclosure, at a decoder, reconstructed spatial neighborhood pixel information or a combination of reconstructed spatial neighborhood pixel information and reconstructed temporal neighborhood pixel information is used to approximate to original pixel information corresponding to a current decode block, and a quantization adjustment factor is derived, thereby adaptively adjusting quantization steps of residual transform coefficients of different areas of an image and improving coding performance.

According to the solutions provided in this embodiment of the present disclosure, parameter information related to quantization adjustment does not need to be transmitted in a bitstream. Therefore, a bit rate is reduced. In addition, in this embodiment of the present disclosure, the quantization adjustment factor may be derived using only the spatial neighborhood pixel information, which is applicable to intra-frame image coding. The method provided in this embodiment of the present disclosure is also applicable to inter-frame image coding.

The decoded pixel information in this embodiment of the present disclosure may be the spatial neighborhood pixel information of the image area X, or may be a combination of the temporal neighborhood pixel information and the spatial neighborhood pixel information of the image area X, and the decoded pixel information includes different content. Therefore, in this embodiment of the present disclosure, the quantization adjustment factor may be calculated according to the decoded pixel information in multiple manners. Specific implementation includes the following.

First, in this embodiment of the present disclosure, the quantization adjustment factor may be calculated according to the parameter corresponding to the decoded pixel information, the pixel average $P_{avg}$, the pixel variance $P_{var}$, the maximum pixel value $P_{max}$, or the minimum pixel value $P_{min}$.

For a specific method for calculating the quantization adjustment factor QC based on the foregoing parameter (the pixel average $P_{avg}$, the pixel variance $P_{var}$, the maximum pixel value $P_{max}$, or the minimum pixel value $P_{min}$), any one of the following manners may be used.

Method 1: The quantization adjustment factor is calculated according to a first function $f_1(P_{avg})$ of the pixel average $P_{avg}$, where the pixel average $P_{avg}$ is an average of luminance components of multiple pixels corresponding to the decoded pixel information or an average of same color space components of the multiple pixels, and the color space component is a color space component corresponding to the first transform coefficient set.

When the decoded pixel includes only spatial neighborhood pixel information, the pixel average $P_{avg}$ is a pixel average $P_{avg}$, where the pixel average $P_{avg}$ is an average of luminance components of multiple pixels in the spatial neighborhood pixel information or an average of same signal components of multiple pixels in the spatial neighborhood pixel information, and the signal component is a signal component corresponding to the first transform coefficient set.

When the decoded pixel is a combination of spatial neighborhood pixel information and temporal neighborhood pixel information, the pixel average $P_{avg}$ is a pixel average $P_{avg}$, where the pixel average $P_{avg}$ is an average of luminance components of multiple pixels in the spatial neighborhood pixel information and the temporal neighborhood pixel information or an average of same signal components of multiple pixels in the spatial neighborhood pixel information and the temporal neighborhood pixel information, and the signal component is a signal component corresponding to the first transform coefficient set.

In a specific example, the first function may be $QC=f_1(P_{avg})^\beta$, where $\beta>0$, for example, $\beta=1$ or 0.5. $f_1(P_{avg})$ may be a U-shaped function about $P_{avg}$. For $f_1(P_{avg})$, a first derivative of $f_1(P_{avg})$ is less than 0 when $P_{avg}$ is less than a threshold T1, a first derivative of $f_1(P_{avg})$ is greater than 0 when $P_{avg}$ is greater than a threshold T2, and $f_1(P_{avg})$ is equal to a constant C0 when $P_{avg}$ is between the thresholds T1 and T2, where T1≥0, T2≥0, and T2≥T1, T1 may be 0, 60, 64, or 128, T2 may be 0, 80, 128, or 170, and C0 is a positive real number and may be 0.5, 0.75, 1, 1.5, 8, 16, 256, or 1024. Further, the function $f_1(P_{avg})$ may be:

$$f_1(P_{avg}) = \begin{cases} C0 \cdot (1 + (T1 - P_{avg})/\eta_1), & P_{avg} < T1 \\ C0, & T1 \le P_{avg} \le T2 \\ C0 \cdot (1 + (P_{avg} - T2)/\eta_2), & P_{avg} > T2 \end{cases}$$

where $\eta_1$ is a positive real number, for example, $\eta_1=150$ or 200.8, and $\eta_2$ is a positive real number, for example, $\eta_2=425$ or 485.5. For another example, the function $f_1(P_{avg})$ is:

$$f_1(P_{avg}) = \begin{cases} C0 \cdot (1 + (T1 - P_{avg})^2/\eta_3), & P_{avg} < T1 \\ C0, & T1 \le P_{avg} \le T2 \\ C0 \cdot (1 + (P_{avg} - T2)/\eta_4), & P_{avg} > T2 \end{cases}$$

where $\eta_3$ is a positive real number, for example, $\eta_3=10240$ or 8135.6, and $\eta_4$ is a positive real number, for example, $\eta_4=256$ or 135.1

Method 2: The quantization adjustment factor is calculated according to a second function $f_2(P_{var})$ of the pixel variance $P_{var}$, where the pixel variance $P_{var}$ is a variance of luminance components of multiple pixels corresponding to the decoded pixel information or a variance of same color space components of the multiple pixels, and the color space component is a color space component corresponding to the first transform coefficient set.

When the decoded pixel includes only spatial neighborhood pixel information, the pixel variance $P_{var}$ is a pixel variance $P_{var}$, where the pixel variance $P_{var}$ is a variance of luminance components of multiple pixels in the spatial neighborhood pixel information or a variance of same signal components of multiple pixels in the spatial neighborhood pixel information, and the signal component is a signal component corresponding to the first transform coefficient set.

When the decoded pixel is a combination of spatial neighborhood pixel information and temporal neighborhood pixel information, the pixel variance $P_{var}$ is a pixel variance $P_{var}$, where the pixel variance $P_{var}$ is a variance of luminance components of multiple pixels in the spatial neighborhood pixel information and the temporal neighborhood pixel information or a variance of same signal components of multiple pixels in the spatial neighborhood pixel information and the temporal neighborhood pixel information, and the signal component is a signal component corresponding to the first transform coefficient set.

In a specific example, the quantization adjustment factor (QC) is calculated according to the second function $QC=f_2(P_{var})^\gamma$ of the pixel variance $P_{var}$, where $\gamma>0$ and $\gamma$ is, for example, 1 or 0.8. $f_2(P_{var})$ may be a monotone function about $P_{var}$. For $f_2(P_{var})$, when $(P_{var})^\alpha$ is less than a threshold T3, $f_2(P_{var})$ is a constant C3, and when $(P_{var})^\alpha$ is greater than or equal to a threshold T3, a first derivative of $f_2(P_{var})$ is greater than 0, where T3≥0, T3 is, for example, 0, 3, 5, or 10, $\alpha>0$, and for example, $\alpha=\frac{1}{2}$ or 1, and C3 is a positive real number, for example, 0.5, 0.8, 1, 16, 32, or 256. Further, the function $f_2(P_{var})$ may be:

$$f_2(P_{var}) = \begin{cases} C3, & (P_{var})^\alpha < T3 \\ C3 \cdot \dfrac{(P_{var})^\alpha - T3 + \eta_5}{\eta_5}, & (P_{var})^\alpha \ge T3 \end{cases},$$

where $\eta_5$ is a positive real time, for example, $\eta_5=10$, 20, 35.5, 80, or 100.

Method 3: The quantization adjustment factor is calculated according to a third function $f_3(P_{max}-P_{min})$ of a difference between the maximum pixel value $P_{max}$ and the minimum pixel value $P_{min}$, where the maximum pixel value $P_{max}$ is a maximum value of luminance components of multiple pixels corresponding to the decoded pixel information or a maximum value of same color space components of the multiple pixels, and the minimum pixel value is a minimum value of the luminance components of the multiple pixels or a minimum value of the same space components of the multiple pixels, and the color space component is a color space component corresponding to the first transform coefficient set.

The quantization adjustment factor QC is calculated according to a combined function $QC=f_1(P_{avg})^\beta \cdot f_2(P_{var})^\gamma$ of the first function $QC=f_1(P_{avg})^\beta$ of the pixel average $P_{avg}$ and the second function $QC=f_2(P_{var})^\gamma$ of the pixel variance $P_{var}$, where $\beta,\gamma>0$, for example, $\beta=1$ and $\gamma=1$, or $\beta=0.5$ and $\gamma=1.5$, or $\beta=2$ and $\gamma=1$.

Method 4: The quantization adjustment factor is calculated according to a third function $f_3(P_{max}-P_{min})$ of a difference between the maximum pixel value $P_{max}$ and the minimum pixel value $P_{min}$, where the maximum pixel value $P_{max}$ is a maximum value of luminance components of multiple pixels corresponding to the decoded pixel information or a maximum value of same color space components of the multiple pixels, and the minimum pixel value is a minimum value of the luminance components of the multiple pixels or a minimum value of the same space components of the multiple pixels, and the color space component is a color space component corresponding to the first transform coefficient set.

When the decoded pixel includes only spatial neighborhood pixel information, the maximum pixel value $P_{max}$ and the minimum pixel value $P_{min}$ are a maximum pixel value $P_{max}$, where the maximum pixel value $P_{max}$ is a maximum value of luminance components of multiple pixels in the spatial neighborhood pixel information or a maximum value of same signal components of multiple pixels in the spatial neighborhood pixel information, and the signal component is a signal component corresponding to the first transform coefficient set, and a minimum pixel value $P_{min}$, where the minimum pixel value $P_{min}$ is a minimum value of the luminance components of the multiple pixels in the spatial neighborhood pixel information or a minimum value of the same signal components of the multiple pixels in the spatial neighborhood pixel information, and the signal component is a signal component corresponding to the first transform coefficient set.

When the decoded pixel is a combination of spatial neighborhood pixel information and temporal neighborhood pixel information, the maximum pixel value $P_{max}$ and the minimum pixel value $P_{min}$ are a maximum pixel value $P_{max}$, where the maximum pixel value $P_{max}$ is a maximum value of luminance components of multiple pixels in the spatial neighborhood pixel information and the temporal neighborhood pixel information or a maximum value of same signal components of multiple pixels in the spatial neighborhood pixel information and the temporal neighborhood pixel information, and the signal component is a signal component corresponding to the first transform coefficient set, and a minimum pixel value $P_{min}$, where the minimum pixel value $P_{min}$ is a minimum value of the luminance components of the multiple pixels in the spatial neighborhood pixel information and the temporal neighborhood pixel information or a minimum value of the same signal components of the multiple pixels in the spatial neighborhood pixel information and the temporal neighborhood pixel information, and the signal component is a signal component corresponding to the first transform coefficient set.

In a specific example, the quantization adjustment factor QC is calculated according to the third function $QC=f_3(P_{max}-P_{min})$ of the difference between the maximum pixel value $P_{max}$ and the minimum pixel value $P_{min}$. The third function may be a monotonically increasing function, for example:

$$f_3(D)=C4\cdot(D^{\eta_6}+\eta_7),$$

where C4 is a positive real number, for example, 0.5, 1, 16, 32, or 256, $\eta_6$ is a positive real time, for example, $\eta_6=1$ or ½, and $\eta_7$ is a positive real number, for example, $\eta_7=20$ or $\eta_7=C4/2$.

After the quantization adjustment factor QC is obtained according to one of the foregoing four methods, optionally, value limitation processing may be further performed on the quantization adjustment factor QC, and QC corresponds to a preset value range. For example, QC is limited to a preset value range, that is:

$$QC = \begin{cases} Val2, & QC > Val2 \\ QC, & Val1 \le QC \le Val2, \quad Val1 < Val2, \\ Val1, & QC < Val1 \end{cases}$$

where Val1 and Val2 are positive real numbers, for example, Val1=0.5 and Val2=2, or Val1=0.6 and Val2=1.5.

For another example, QC is mapped to a value range using a mapping function, and the mapping function is for example:

$$QC = \frac{Val5}{\frac{Val6}{QC} + Val3} + Val4,$$

where Val3, Val4, Val5, and Val6 are real numbers, for example, Val3=1.0, Val4=0.5, Val5=1.5, and Val6=1.0, or, Val3=1.1, Val4=0.4, Val5=1.2, and Val6=1.15.

The foregoing parameters T1, T2, T3, C0, C3, C4, $\eta_1$, $\eta_2$, $\eta_3$, $\eta_4$, $\eta_5$, $\eta_6$, $\eta_7$, Val1, Val2, Val3, Val4, Val5, and Val6 may be preset constants, or may be obtained by means of calculation according to the statistical feature of the video image, or may be extracted from a video bitstream.

In this embodiment of the present disclosure, the dequantization processing in step 104 may be implemented in multiple manners. The following provides several feasible methods.

Method 1: A first quantization step corresponding to the first transform coefficient set is obtained from a signal corresponding to the current decoded image, and scaling is performed on the first quantization step using the quantization adjustment factor to obtain a second quantization step, and dequantization is performed on the first transform coefficient set using the second quantization step to obtain the second transform coefficient set. Specific implementation may include obtaining, from the signal corresponding to the current decoded image, the first quantization step Qs(i) corresponding to the first transform coefficient set, and performing scaling on the first quantization step Qs(i) according to the quantization adjustment factor to obtain Qs(i)·QC, and performing dequantization on the transform coefficient A(i) in a first transform coefficient set to obtain a transform coefficient R(i) in the second transform coefficient set, that is:

$$R(i)=\text{sign}\{A(i)\}\cdot\text{round}\{A(i)\cdot Qs(i)\cdot QC+o2(i)\},$$

where o2(i) is a rounding constant, for example, o2(i)=0.5. When the dequantization is implemented by means of integer addition and shifting, the following formula may be used:

$$R(i)=\text{sign}\{A(i)\}\cdot(A(i)\cdot Qs'(i)\cdot QC'+(1<<(bd\text{shift}-1+\text{delta})))>>(bd\text{shift}+\text{delta}),$$

where Qs'(i) is an integer result of the first quantization step, and bdshift a quantity of shifting bits in the signal corresponding to the current decoded image, QC' is an integer result of QC, for example, QC' may be obtained by means of rounding after QC is multiplied by integer powers of 2, or QC' may be obtained by directly rounding QC, or an integer result of QC is obtained by looking up a table according to a pixel average and a pixel variance, and delta is a quantity of additionally required shifting bits.

Method 2: A target level scaling list corresponding to the quantization adjustment factor is determined according to a preset first correspondence, where the first correspondence is a correspondence between quantization adjustment factors and level scaling lists, and dequantization is performed on the first transform coefficient set according to the target level scaling list to obtain the second transform coefficient set.

In this embodiment of the present disclosure, the first correspondence between the quantization adjustment factors QCs and multiple level scaling lists may be preset.

Further, a value range of QC is divided into H1 (H1 is a positive integer greater than 1, for example H1=3, 5, or 6) intervals in advance, and each interval corresponds to a preset level scaling list. A value interval to which the quantization adjustment factor QC obtained by means of calculation belongs is retrieved, and a level scaling list corresponding to the value interval to which the quantization adjustment factor QC belongs is selected as the level scaling list by which dequantization is performed on the first transform coefficient set. For example, a mapping relationship table (Table 1) between QC and a level scaling list gives an example in which for level scaling lists including six elements each, one level scaling list is selected according to QC.

TABLE 1

|  | Level scaling list |
| --- | --- |
| QC ≥ 1.5 | {60, 68, 77, 86, 96, 108} |
| 1.2 < QC < 1.5 | {54, 61, 69, 77, 86, 97} |
| 0.8 ≤ QC ≤ 1.2 | {40, 45, 51, 57, 64, 72} |
| 0.6 < QC < 0.8 | {28, 32, 36, 40, 45, 50} |
| QC ≤ 0.6 | {24, 27, 31, 34, 38, 43} |

According to the example given in Table 1, when QC is 0.9, the value range to which QC belongs is retrieved as 0.8≤QC≤1.2, and the level scaling list {40, 45, 51, 57, 64, 72} corresponding to the value range 0.8≤QC≤1.2 is selected as the level scaling list by which dequantization is performed on the first transform coefficient set.

Method 3: A target quantization matrix corresponding to the quantization adjustment factor is determined according to a preset second correspondence, where the second correspondence is a correspondence between quantization adjustment factors and quantization matrices, and dequantization is performed on the first transform coefficient set according to the target quantization matrix to obtain the second transform coefficient set.

A value range of QC is divided into H2 (H2 is a positive integer greater than 1, for example H2=3, 5, or 6) intervals in advance, and each interval corresponds to a preset quantization matrix. A value interval to which QC belongs is retrieved, and a corresponding quantization matrix is selected as the quantization matrix by which dequantization is performed on the first transform coefficient set. For example, Table 2 gives a 4×4 transform block.

TABLE 2

|  | QC < 16 | 16 ≤ QC ≤ 64 | QC > 64 |
| --- | --- | --- | --- |
| 4 × 4 quantization matrix | 16, 13, 14, 14, 13, 14, 16, 16, 14, 16, 16, 16, 14, 16, 16, 16 | 16, 16, 16, 16, 16, 16, 16, 16, 16, 16, 16, 16, 16, 16, 16, 16 | 18, 18, 16, 16, 18, 18, 20, 16, 16, 20, 20, 22, 16, 16, 22, 16 |

According to the example given in Table 2, if a QC value obtained by means of calculation is 18, and the value range to which QC belongs can be determined as 16≤QC≤64 from parameters given in Table 2, the corresponding 4×4 quantization matrix by which dequantization is performed on the first transform coefficient set is a 4×4 quantization matrix shown in the third row in Table 2.

Method 4: A first QP corresponding to the first transform coefficient set is obtained from a signal corresponding to the current decoded image, a target QP offset is determined according to the quantization adjustment factor, and the target QP offset is added to the first QP to obtain a second QP, and a level scale is determined according to the second QP, and dequantization is performed on the first transform coefficient set using the level scale, to obtain the second transform coefficient set.

Dequantization on a first transform parameter set using the level scale l(i) may be further implemented using the following formulas:

$$dQP = \text{round}\{6 \cdot \log_2(QC) + o3\},$$

$$QP_2 = QP + dQP, \text{ and}$$

$$l(i) = \text{levelScale}[QP_2\%6] << \lfloor QP_2/6 \rfloor,$$

where o3 is a rounding offset.

Method 5: A first quantization step corresponding to the first transform coefficient set is obtained from a signal corresponding to the current decoded image, dequantization is performed on the coefficient in the first transform coefficient set using the first quantization step to obtain a coefficient in a third transform coefficient set, and scaling is performed on the coefficient in the third transform coefficient set using the quantization adjustment factor obtained by means of calculation in order to obtain the second transform coefficient set.

Specific implementation includes first performing dequantization on the first transform coefficient set using the first quantization step Qs(i) to obtain the third transform coefficient set B(i), that is:

$$B(i) = \text{sign}\{A(i)\} \cdot \text{round}\{A(i) \cdot Qs(i) + o4(i)\}, \text{ and}$$

then, performing scaling and rounding on B(i) to obtain the second transform coefficient R(i), that is:

$$R(i) = \text{sign}\{B(i)\} \cdot \text{round}\{B(i) \cdot QC + o5(i)\},$$

where o4 and o5 are rounding offsets.

The first QP is a default QP that is of the transform block in which the first transform coefficient set is located and that is indicated by the signal corresponding to the current decoded image, for example, a frame-level QP.

According to the solutions provided in this embodiment of the present disclosure, at a decoder, reconstructed spatial neighborhood pixel information or a combination of reconstructed spatial neighborhood pixel information and reconstructed temporal neighborhood pixel information is used to approximate to original pixel information corresponding to a current decode block, and a quantization adjustment factor is derived, thereby adaptively adjusting quantization steps of residual transform coefficients of different areas of an image and improving coding performance.

Figure 4:
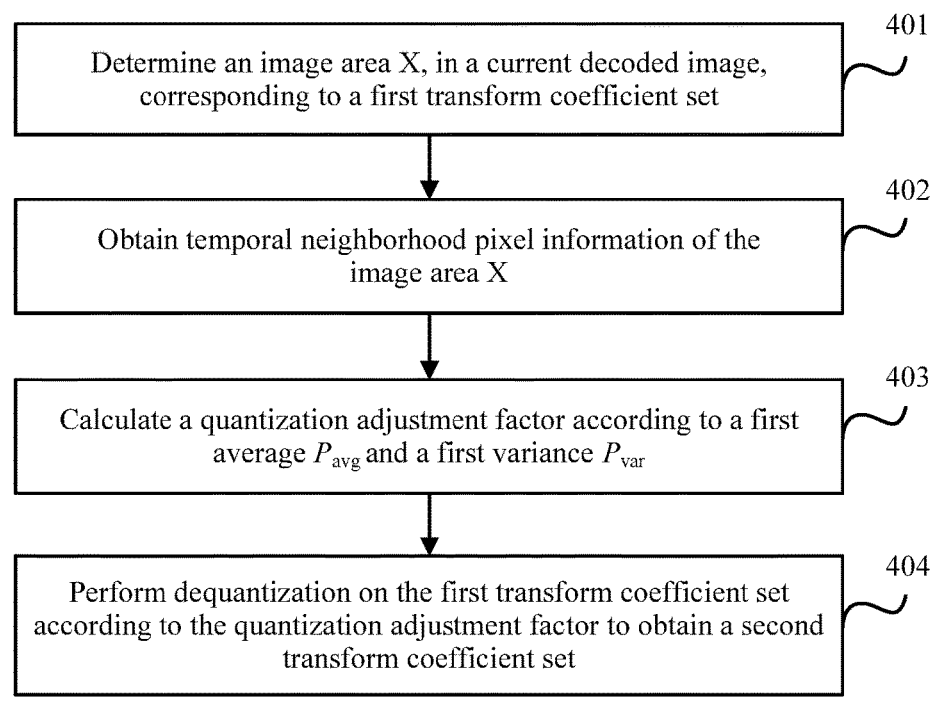
FIG. 4 is a schematic flowchart of another adaptive dequantization method in video coding according to an embodiment of the present disclosure.

As shown in FIG. 4, an embodiment of the present disclosure further provides another adaptive dequantization method in video coding, and the method includes the following steps.

Step 401: Determine an image area X, in a current decoded image, corresponding to a first transform coefficient set, where the first transform coefficient set includes N transform coefficients, the transform coefficient is a transform coefficient of any color space component in the current decoded image, and N is a positive integer.

In this embodiment, the first transform coefficient set may include all alternating current coefficients of a luminance component transform block or all coefficients in a luminance component transform block.

Step 402: Obtain temporal neighborhood pixel information of the image area X.

The temporal neighborhood pixel information includes a reconstructed value of at least one pixel in a corresponding area of the image area X in another coded image or a sub-pixel accuracy reconstructed value obtained by means of interpolation filtering, and/or, a weighted average of reconstructed values of pixels, at at least one location in corresponding areas in at least two decoded images, corresponding to the image area X.

When the corresponding area of the image area X in the other coded image is a sub-pixel location, the temporal neighborhood pixel information is a sub-pixel accuracy reconstructed value, at the sub-pixel location, obtained by means of interpolation filtering.

Step 403: Calculate a quantization adjustment factor according to a first average $P_{avg}$ and a first variance $P_{var}$, where the first average $P_{avg}$ is an average of luminance components of multiple pixels in the decoded pixel information or an average of same color space components of the multiple pixels, and the first variance $P_{var}$ is a variance of the luminance components of the multiple pixels or a variance of the same color space components of the multiple pixels, and the color space component is a color space component corresponding to the first transform coefficient set.

The quantization adjustment factor QC is calculated according to a combined function $QC=f_1(P_{avg})^\beta \cdot f_2(P_{var})^\gamma$ of a first function $QC=f_1(P_{avg})^\beta$ of the first average $P_{avg}$ and a second function $QC=f_2(P_{var})^\gamma$ of the first variance $P_{var}$, for example, $\beta=0.4$ and $\gamma=0.6$, or $\beta=0.5$ and $\gamma=0.5$. The first function is for example:

$$f_1(P_{avg}) = \begin{cases} 0.55 \cdot (1+(64-P_{avg})^2/32), & P_{avg} < 64 \\ 0.55, & 64 \le P_{avg} \le 128 \\ 0.55 \cdot (1+(P_{avg}-128)/256), & P_{avg} > 128 \end{cases}$$

The second function is for example:

$$f_2(P_{var}) = \frac{P_{var}+80}{80}.$$

In this embodiment of the present disclosure, after the quantization adjustment factor is calculated using the first function and the second function, optionally, the quantization adjustment factor QC may be further processed, which includes performing value limitation processing on the quantization adjustment factor QC, where QC corresponds to a preset value range.

An optional manner of specific implementation for the value limitation processing includes limiting QC to a preset value range, or mapping QC to a value range using a mapping function.

Step 404: Perform dequantization on the first transform coefficient set according to the quantization adjustment factor to obtain a second transform coefficient set.

In this embodiment of the present disclosure, dequantization transform of the first transform coefficient set may be implemented in multiple manners. The following provides several feasible methods.

Method 1: A first quantization step corresponding to the first transform coefficient set is obtained from a signal corresponding to the current decoded image, and scaling is performed on the first quantization step using the quantization adjustment factor to obtain a second quantization step, and dequantization is performed on the first transform coefficient set using the second quantization step to obtain the second transform coefficient set. Specific implementation may be obtaining, from the signal corresponding to the current decoded image, the first quantization step Qs(i) corresponding to the first transform coefficient set, and performing scaling on the first quantization step Qs(i) according to the quantization adjustment factor to obtain Qs(i)·QC, and performing dequantization on the transform coefficient A(i) in a first transform coefficient set to obtain a transform coefficient R(i) in the second transform coefficient set, that is:

$$R(i)=\text{sign}\{A(i)\}\cdot\text{round}\{A(i)\cdot Qs(i)\cdot QC+o2(i)\},$$

where o2(i) is a rounding constant, for example, o2(i)=0.5. When the dequantization is implemented by means of integer addition and shifting, the following formula may be used $$R(i)=\text{sign}\{A(i)\}\cdot(A(i)\cdot Qs'(i)\cdot QC'+(1<<(bd\text{shift}-1+\text{delta})))>>(bd\text{shift}+\text{delta}),$$

where Qs'(i) is an integer result of the first quantization step, and bdshift a quantity of shifting bits in the signal corresponding to the current decoded image, QC' is an integer result of QC, for example, QC' may be obtained by means of rounding after QC is multiplied by integer powers of 2, or QC' may be obtained by directly rounding QC, or an integer result of QC is obtained by looking up a table according to a pixel average and a pixel variance, and delta is a quantity of additionally required shifting bits.

Method 2: A target level scaling list corresponding to the quantization adjustment factor is determined according to a preset first correspondence, where the first correspondence is a correspondence between quantization adjustment factors and level scaling lists, and dequantization is performed on the first transform coefficient set according to the target level scaling list to obtain the second transform coefficient set.

In this embodiment of the present disclosure, the first correspondence between the quantization adjustment factors QCs and multiple level scaling lists may be preset.

Further, a value range of QC is divided into H1 (H1 is a positive integer greater than 1, for example H1=3, 5, or 6) intervals in advance, and each interval corresponds to a preset level scaling list. A value interval to which the quantization adjustment factor QC obtained by means of calculation belongs is retrieved, and a level scaling list corresponding to the value interval to which the quantization adjustment factor QC belongs is selected as the level scaling list by which dequantization is performed on the first transform coefficient set. For example, a mapping relationship table (Table 3) between QC and a level scaling list gives an example in which for level scaling lists including six elements each, one level scaling list is selected according to QC.

TABLE 3

| | Level scaling list |
|---|---|
| QC ≥ 1.5 | {60, 68, 77, 86, 96, 108} |
| 1.2 < QC < 1.5 | {54, 61, 69, 77, 86, 97} |
| 0.8 ≤ QC ≤ 1.2 | {40, 45, 51, 57, 64, 72} |
| 0.6 < QC < 0.8 | {28, 32, 36, 40, 45, 50} |
| QC ≤ 0.6 | {24, 27, 31, 34, 38, 43} |

According to the example given in Table 3, when QC is 0.9, the value range to which QC belongs is retrieved as 0.8≤QC≤1.2, and the level scaling list {40, 45, 51, 57, 64, 72} corresponding to the value range 0.8≤QC≤1.2 is selected as the level scaling list by which dequantization is performed on the first transform coefficient set.

Method 3: A target quantization matrix corresponding to the quantization adjustment factor is determined according to a preset second correspondence, where the second correspondence is a correspondence between quantization adjustment factors and quantization matrices, and dequantization is performed on the first transform coefficient set according to the target quantization matrix to obtain the second transform coefficient set.

A value range of QC is divided into H2 (H2 is a positive integer greater than 1, for example H2=3, 5, or 6) intervals in advance, and each interval corresponds to a preset quantization matrix. A value interval to which QC belongs is retrieved, and a corresponding quantization matrix is selected as the quantization matrix by which dequantization is performed on the first transform coefficient set. For example, Table 4 gives a 4×4 transform block

TABLE 4

|  | QC < 16 | 16 ≤ QC ≤ 64 | QC > 64 |
|---|---|---|---|
| 4 × 4 quantization matrix | 16, 13, 14, 14, 13, 14, 16, 16, 14, 16, 16, 16, 14, 16, 16, 16 | 16, 16, 16, 16, 16, 16, 16, 16, 16, 16, 16, 16, 16, 16, 16, 16 | 18, 18, 16, 16, 18, 18, 20, 16, 16, 20, 20, 22, 16, 16, 22, 16 |

According to the example given in Table 4, if a QC value obtained by means of calculation is 18, and the value range to which QC belongs can be determined as 16≤QC≤64 from parameters given in Table 4, the corresponding 4×4 quantization matrix by which dequantization is performed on the first transform coefficient set is a 4×4 quantization matrix shown in the third row in Table 4.

Method 4: A first QP corresponding to the first transform coefficient set is obtained from a signal corresponding to the current decoded image, a target QP offset is determined according to the quantization adjustment factor, and the target QP offset is added to the first QP to obtain a second QP, and a level scale is determined according to the second QP, and dequantization is performed on the first transform coefficient set using the level scale, to obtain the second transform coefficient set.

Dequantization on a first transform parameter set using the level scale l(i) may be further implemented using the following formulas:

$$dQP = \text{round}\{6 \cdot \log_2(QC) + o3\},$$

$$QP_2 = QP + dQP, \text{ and}$$

$$l(i) = \text{levelScale}[QP_2\%6] << \lfloor QP_2/6 \rfloor,$$

where $o3$ is a rounding offset.

Method 5: A first quantization step corresponding to the first transform coefficient set is obtained from a signal corresponding to the current decoded image, dequantization is performed on the coefficient in the first transform coefficient set using the first quantization step to obtain a coefficient in a third transform coefficient set, and scaling is performed on the coefficient in the third transform coefficient set using the quantization adjustment factor obtained by means of calculation in order to obtain the second transform coefficient set.

Specific implementation includes first performing dequantization on the first transform coefficient set using the first quantization step $Qs(i)$ to obtain the third transform coefficient set $B(i)$, that is:

$$B(i) = \text{sign}\{A(i)\} \cdot \text{round}\{A(i) \cdot Qs(i) + o4(i)\},$$

and then, performing scaling and rounding on B(i) to obtain the second transform coefficient R(i), that is:

$$R(i) = \text{sign}\{B(i)\} \cdot \text{round}\{B(i) \cdot QC + o5(i)\},$$

where $o4$ and $o5$ are rounding offsets.

The first QP is a default QP that is of the transform block in which the first transform coefficient set is located and that is indicated by the signal corresponding to the current decoded image, for example, a frame-level QP.

The following describes solutions in an embodiment of the present disclosure in detail with reference to a specific parameter, and specific implementation includes the following.

A first transform coefficient set includes all coefficients of a luminance component transform block. An image area X is an 8×8 area (that is, a rectangular area including eight rows and eight columns of pixels). Coordinates of an upper left pixel of the image area X are denoted as $(x_0, y_0)$. Generally, in a coordinate system of an image, a left-to-right direction is defined as an x direction, and an up-to-down direction is defined as a y direction.

Spatial neighborhood pixel information includes the following two parts.

(1) Pixel information in a spatial neighborhood Y1 of the image area X, and the spatial neighborhood pixel information includes a reconstructed value of at least one pixel in the spatial neighborhood Y1. It is assumed that pixel coordinates (x, y) included in the spatial neighborhood Y1 meet the following condition:

$$x_0-J1 \leq x \leq x_0+J2, \ y_0-J3 \leq y \leq y_0-J4, \text{ or}$$

$$y_0-J5 \leq y \leq y_0+J6, \ x_0-J7 \leq x \leq x_0-J8,$$

where J1 to J8 are positive integers, for example, J1=J2=J3=J5=J6=J7=8 and J4=J8=1, or J1=J3=12, J2=4, J4=1, J5=J7=12, J6=4, and J8=1, or J1=5, J2=8, J3=6, J4=2, J5=10, J6=11, J7=12, and J8=1.

(2) Predicted pixel information that is of the image area X and that is generated according to pixel information in a spatial neighborhood Y2 of the image area X in an intra-prediction manner. The pixel information includes at least one intra-predicted pixel of the image area X. Pixel coordinates (x, y) included in the spatial neighborhood Y2 meet the following condition:

$$x = x_0-1, \ y_0-1 \leq y \leq y+S1, \text{ or}$$

$$y = y_0-1, \ x_0-1 \leq x \leq x+S2,$$

where S1 and S2 are positive integers, for example, S1=S2=15, or S1=7 and S2=15. The intra-prediction manner may be one of 33 directional intra-prediction modes, a DC prediction mode, or a planar prediction mode in the H.265/HEVC.

The quantization adjustment factor QC is jointly determined by a first function $f_1(P_{avg})$ of a pixel average $P_{avg}$ and a second function $f_2(P_{var})$ about the pixel variance $P_{var}$, and $QC = f_1(P_{avg})^{1/2} \cdot f_2(P_{var})^{1/2}$ is used. A variance $P_{var}$ and an average $P_{avg}$ of luminance components are a variance and an average of all pixels in the spatial neighborhood pixel information. The first function and the second function are:

$$f_1(P_{avg}) = \begin{cases} (1+(60-P_{avg})/150), & P_{avg} < 60 \\ 1, & 60 \leq P_{avg} \leq 170 \\ (1+(P_{avg}-170)/425), & P_{avg} > 170 \end{cases}, \text{ and}$$

$$f_2(P_{var}) = \begin{cases} 0.5, & (P_{var})^{1/2} < 5 \\ 0.5 \times \dfrac{(P_{var})^{1/2}+10}{10}, & (P_{var})^{1/2} \geq 5 \end{cases}.$$

Dequantization of the transform coefficient of the first transform coefficient set is adjusted according to the quantization adjustment factor, and dequantization is performed on the first transform coefficient set to obtain a second transform coefficient set. A method for adjusting dequantization of the transform coefficient of the first transform coefficient set includes performing scaling on an original quantization step Qs(i) of the first transform coefficient set according to the quantization adjustment factor, and using a scaled quantization step as a quantization step by which dequantization is performed on the first transform coefficient set.

Figure 5:
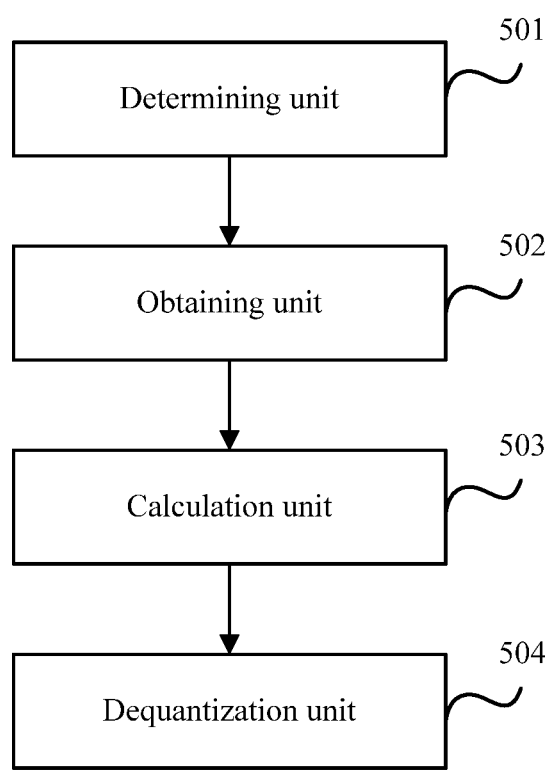
FIG. 5 is a schematic structural diagram of an adaptive dequantization apparatus in video coding according to an embodiment of the present disclosure.

As shown in FIG. 5, an embodiment of the present disclosure provides an adaptive dequantization apparatus in video coding, and the apparatus includes a determining unit 501 configured to determine an image area, in a current decoded image, corresponding to a first transform coefficient set, where the first transform coefficient set includes N transform coefficients, the transform coefficient is a transform coefficient of any color space component in the current decoded image, and N is a positive integer, an obtaining unit 502 configured to obtain decoded pixel information of the image area, where the decoded pixel information includes spatial neighborhood pixel information of the image area, where in this embodiment of the present disclosure, the obtaining unit 502 is further configured to obtain temporal neighborhood pixel information of the image area and/or pixel information of the image area from the decoded pixel information, a calculation unit 503 configured to calculate a quantization adjustment factor according to the decoded pixel information, and a dequantization unit 504 configured to perform dequantization on the first transform coefficient set according to the quantization adjustment factor to obtain a second transform coefficient set.

In this embodiment of the present disclosure, the calculation unit 503 calculates the quantization adjustment factor according to the decoded pixel information in multiple specific implementation manners. The following provides several feasible manners.

Manner 1: The quantization adjustment factor is calculated according to a pixel average $P_{avg}$ of the decoded pixel information, and the calculation unit 503 is further configured to calculate the quantization adjustment factor according to a first function $f_1(P_{avg})$ of the pixel average $P_{avg}$, where the pixel average $P_{avg}$ is an average of luminance components of multiple pixels corresponding to the decoded pixel information or an average of same color space components of the multiple pixels, and the color space component is a color space component corresponding to the first transform coefficient set.

Manner 2: The quantization adjustment factor is calculated according to a pixel variance $P_{var}$ of the decoded pixel information, and the calculation unit 503 is further configured to calculate the quantization adjustment factor according to a second function $f_2(P_{var})$ of the pixel variance $P_{var}$, where the pixel variance $P_{var}$ is a variance of luminance components of multiple pixels corresponding to the decoded pixel information or a variance of same color space components of the multiple pixels, and the color space component is a color space component corresponding to the first transform coefficient set.

Manner 3: The quantization adjustment factor is calculated according to a pixel variance $P_{var}$ and a pixel average $P_{avg}$ of the decoded pixel information, and the calculation unit 503 is further configured to calculate the quantization adjustment factor according to a combined function $f_1(P_{avg}) \cdot f_2(P_{var})$ of the pixel variance $P_{var}$ and the pixel average $P_{avg}$, where the pixel average $P_{avg}$ is an average of luminance components of multiple pixels in the decoded pixel information or an average of same color space components of the multiple pixels, and the pixel variance $P_{var}$ is a variance of the luminance components of the multiple pixels or a variance of the same color space components of the multiple pixels, and the color space component is a color space component corresponding to the first transform coefficient set.

Manner 4: The quantization adjustment factor is calculated according to a maximum pixel value $P_{max}$ and a minimum pixel value $P_{min}$ of the decoded pixel information, and the calculation unit 503 is further configured to calculate the quantization adjustment factor according to a third function $f_3(P_{max}-P_{min})$ of a difference between the maximum pixel value $P_{max}$ and the minimum pixel value $P_{min}$, where the maximum pixel value $P_{max}$ is a maximum value of luminance components of multiple pixels corresponding to the decoded pixel information or a maximum value of same color space components of the multiple pixels, and the minimum pixel value is a minimum value of the luminance components of the multiple pixels or a minimum value of the same space components of the multiple pixels, and the color space component is a color space component corresponding to the first transform coefficient set.

In this embodiment of the present disclosure, the dequantization unit 504 performs, in multiple specific implementation manners, dequantization on the first transform coefficient set according to the quantization adjustment factor to obtain the second transform coefficient set. The following provides several feasible manners.

Manner 1: Dequantization is performed on the first transform coefficient set using a level scaling list, and the dequantization unit 504 is further configured to determine, according to a preset first correspondence, a target level scaling list corresponding to the quantization adjustment factor, where the first correspondence is a correspondence between quantization adjustment factors and level scaling lists, and perform dequantization on the first transform coefficient set according to the target level scaling list to obtain the second transform coefficient set.

Manner 2: Dequantization is performed on the first transform coefficient set using a quantization matrix, and the dequantization unit 504 is further configured to determine, according to a preset second correspondence, a target quantization matrix corresponding to the quantization adjustment factor, where the second correspondence is a correspondence between quantization adjustment factors and quantization matrices, and perform dequantization on the first transform coefficient set according to the target quantization matrix to obtain the second transform coefficient set.

Manner 3: Dequantization is performed on the first transform coefficient set using a difference between a QP carried in a signal corresponding to the current decoded image and an adaptive QP obtained by means of calculation, and the dequantization unit 504 is further configured to obtain, from a signal corresponding to the current decoded image, a first QP corresponding to the first transform coefficient set, determine a target QP offset according to the quantization adjustment factor, and add the target QP offset to the first QP to obtain a second QP, and determine a level scale according to the second QP, and perform dequantization on the first transform coefficient set using the level scale, to obtain the second transform coefficient set.

Manner 4: Dequantization is performed on the first transform coefficient set using a quantization step carried in a signal corresponding to the current decoded image, and the dequantization unit 504 is further configured to obtain, from a signal corresponding to the current decoded image, a first quantization step corresponding to the first transform coefficient set, and perform scaling on the first quantization step using the quantization adjustment factor to obtain a second quantization step, and perform dequantization on the first transform coefficient set using the second quantization step to obtain the second transform coefficient set.

Manner 5: Dequantization is performed on the first transform coefficient set using a quantization step carried in a signal corresponding to the current decoded image, and the dequantization unit 504 is further configured to obtain, from a signal corresponding to the current decoded image, a first quantization step corresponding to the first transform coefficient set, perform dequantization on the coefficient in the first transform coefficient set using the first quantization step to obtain a coefficient in a third transform coefficient set, and perform scaling on the coefficient in the third transform coefficient set using the quantization adjustment factor obtained by means of calculation in order to obtain the second transform coefficient set.

The foregoing one or more technical solutions in the embodiments of this application have at least the following technical effects.

According to the solutions provided in the embodiments of the present disclosure, a statistical feature of a background area in which a current transform block is located is estimated using spatial neighborhood information, or temporal neighborhood information, or spatial neighborhood information and temporal neighborhood information of the transform block, a quantization adjustment factor for dequantization is adaptively derived, and dequantization processing is flexibly adjusted. On one hand, according to the adaptive quantization method of the present disclosure, quantization distortion intensity can be more suitable for visual perception of human eyes, thereby improving coding efficiency. On the other hand, in comparison with an existing solution in which quantization adjustment information is transmitted in a bitstream, according to the present disclosure, extra bit overheads are not required to transmit the quantization adjustment information, thereby further improving the coding efficiency.

In addition, the present disclosure is applicable to coding of an intra-frame (I-frame) image and an inter-frame (P-frame or B-frame) image. Therefore, the technical solutions provided in this embodiment of the present disclosure have a relatively wide application range.

The method described in the present disclosure is not limited to the embodiment in a specific implementation manner, and another implementation manner obtained by persons skilled in the art according to the technical solutions of the present disclosure also falls within the technological innovation scope of the present disclosure.

Obviously, persons skilled in the art may make various modifications and variations to the present disclosure without departing from the spirit and scope of the present disclosure. The present disclosure is also intended to cover these modifications and variations as long as they fall within the scope of the claims of the present disclosure and their equivalent technologies.

What is claimed is:

1. An adaptive dequantization method in video coding, comprising:
    determining an image area, in a current decoded image, corresponding to a first transform coefficient set, the first transform coefficient set comprising N transform coefficients of any color space component in the current decoded image, and N being a positive integer;
    obtaining decoded pixel information of the image area, the decoded pixel information comprising spatial neighborhood pixel information of the image area;
    calculating a quantization adjustment factor according to the decoded pixel information and a pixel average ($P_{avg}$), the $P_{avg}$ being an average of luminance components of multiple pixels corresponding to the decoded pixel information or an average of the same color space components of the multiple pixels; and
    performing dequantization on the first transform coefficient set according to the quantization adjustment factor to obtain a second transform coefficient set.

2. The method of claim 1, wherein the decoded pixel information further comprises temporal neighborhood pixel information of the image area or pixel information of the image area.

3. The method of claim 1, wherein calculating the quantization adjustment factor comprises calculating the quantization adjustment factor according to a first function ($f_1(P_{avg})$) of a pixel average ($P_{avg}$), and the color space component corresponds to the first transform coefficient set.

4. The method of claim 1, wherein calculating the quantization adjustment factor comprises calculating the quantization adjustment factor according to a combined function ($f_1(P_{avg}) \cdot f_2(P_{var})$) of a pixel variance ($P_{var}$) and a pixel average ($P_{avg}$), the $P_{avg}$ is an average of luminance components of the multiple pixels in the decoded pixel information or an average of the same color space components of the multiple pixels, the $P_{var}$ is a variance of the luminance components of the multiple pixels or a variance of the same color space components of the multiple pixels, and the color space component corresponds to the first transform coefficient set.

5. The method of claim 1, wherein performing dequantization on the first transform coefficient set to obtain the second transform coefficient set comprises:
    determining, according to a preset first correspondence, a target level scaling list corresponding to the quantization adjustment factor, the first correspondence being between quantization adjustment factors and level scaling lists; and
    performing dequantization on the first transform coefficient set according to the target level scaling list to obtain the second transform coefficient set.

6. The method of claim 1, wherein performing dequantization processing on the first transform coefficient set to obtain the second transform coefficient set comprises:
    determining, according to a preset second correspondence, a target quantization matrix corresponding to the quantization adjustment factor, the second correspondence being between quantization adjustment factors and quantization matrices; and
    performing dequantization on the first transform coefficient set according to the target quantization matrix to obtain the second transform coefficient set.

7. The method of claim 1, wherein performing dequantization processing on the first transform coefficient set to obtain the second transform coefficient set comprises:
    obtaining, from a signal corresponding to the current decoded image, a first quantization parameter corresponding to the first transform coefficient set;
    determining a target quantization parameter offset according to the quantization adjustment factor;

adding the target quantization parameter offset to the first quantization parameter to obtain a second quantization parameter;

determining a level scale according to the second quantization parameter; and performing dequantization on the first transform coefficient set using the level scale, to obtain the second transform coefficient set.

8. The method of claim 1, wherein performing dequantization processing on the first transform coefficient set to obtain the second transform coefficient set comprises:

obtaining, from a signal corresponding to the current decoded image, a first quantization step corresponding to the first transform coefficient set;

performing scaling on the first quantization step using the quantization adjustment factor to obtain a second quantization step; and performing dequantization on the first transform coefficient set using the second quantization step to obtain the second transform coefficient set.

9. The method of claim 1, wherein performing dequantization processing on the first transform coefficient set to obtain the second transform coefficient set comprises:

obtaining, from a signal corresponding to the current decoded image, a first quantization step corresponding to the first transform coefficient set;

performing dequantization on a transform coefficient in the first transform coefficient set using the first quantization step to obtain a coefficient in a third transform coefficient set; and performing scaling on the coefficient in the third transform coefficient set using the quantization adjustment factor obtained by means of calculation in order to obtain the second transform coefficient set.

10. An adaptive dequantization method in video coding, comprising:

determining an image area (X), in a current decoded image, corresponding to a first transform coefficient set, the first transform coefficient set comprising N transform coefficients of any color space component in the current decoded image, and N being a positive integer;

obtaining temporal neighborhood pixel information of X;

calculating a quantization adjustment factor according to a first variance ($P_{var}$), the $P_{var}$ being a variance of luminance components of multiple pixels or a variance of the same color space components of the multiple pixels, and the color space component corresponding to the first transform coefficient set; and performing dequantization processing on the first transform coefficient set according to the quantization adjustment factor to obtain a second transform coefficient set.

11. The method of claim 10, wherein calculating the quantization adjustment factor comprises calculating the quantization adjustment factor according to a combined function ($f_1(P_{avg}) \cdot f_2(P_{var})$) of a pixel average ($P_{avg}$) and the $P_{var}$, and the $P_{avg}$ is an average of luminance components of the multiple pixels in the temporal neighborhood pixel information or an average of the same color space components of the multiple pixels.

12. The method of claim 10, wherein performing dequantization processing on the first transform coefficient set to obtain the second transform coefficient set comprises:

determining, according to a preset first correspondence, a target level scaling list corresponding to the quantization adjustment factor, the first correspondence being between quantization adjustment factors and level scaling lists; and performing dequantization on the first transform coefficient set according to the target level scaling list to obtain the second transform coefficient set.

13. The method of claim 10, wherein performing dequantization processing on the first transform coefficient set to obtain the second transform coefficient set comprises:

determining, according to a preset second correspondence, a target quantization matrix corresponding to the quantization adjustment factor, the second correspondence being between quantization adjustment factors and quantization matrices; and performing dequantization on the first transform coefficient set according to the target quantization matrix to obtain the second transform coefficient set.

14. The method of claim 10, wherein performing dequantization processing on the first transform coefficient set to obtain the second transform coefficient set comprises:

obtaining, from a signal corresponding to the current decoded image, a first quantization parameter corresponding to the first transform coefficient set;

determining a target quantization parameter offset according to the quantization adjustment factor;

adding the target quantization parameter offset to the first quantization parameter to obtain a second quantization parameter;

determining a level scale according to the second quantization parameter; and performing dequantization on the first transform coefficient set using the level scale, to obtain the second transform coefficient set.

15. The method of claim 10, wherein performing dequantization processing on the first transform coefficient set to obtain the second transform coefficient set comprises:

obtaining, from a signal corresponding to the current decoded image, a first quantization step corresponding to the first transform coefficient set;

performing scaling on the first quantization step using the quantization adjustment factor to obtain a second quantization step; and performing dequantization on the first transform coefficient set using the second quantization step to obtain the second transform coefficient set.

16. The method of claim 10, wherein performing dequantization processing on the first transform coefficient set to obtain the second transform coefficient set comprises:

obtaining, from a signal corresponding to the current decoded image, a first quantization step corresponding to the first transform coefficient set;

performing dequantization on a transform coefficient in the first transform coefficient set using the first quantization step to obtain a coefficient in a third transform coefficient set; and performing scaling on the coefficient in the third transform coefficient set using the quantization adjustment factor obtained by means of calculation in order to obtain the second transform coefficient set.

17. An adaptive dequantization apparatus in video coding, comprising:

a memory comprising instructions; and a processor coupled to the memory and configured to execute the instructions, which causes the processor to be configured to:

determine an image area, in a current decoded image, corresponding to a first transform coefficient set, the first transform coefficient set comprising N transform coefficients of any color space component in the current decoded image, and N being a positive integer;

obtain decoded pixel information of the image area, the decoded pixel information comprising spatial neighborhood pixel information of the image area;

calculate a quantization adjustment factor according to third function ($f_3(P_{max}-P_{min})$) of a difference between a maximum pixel value ($P_{max}$) and a minimum pixel value ($P_{min}$), the $P_{max}$ being a maximum value of luminance components of multiple pixels corresponding to the decoded pixel information or a maximum value of the same color space components of the multiple pixels, the $P_{min}$ being a minimum value of the luminance components of the multiple pixels or a minimum value of the same space components of the multiple pixels, and the color space component corresponding to the first transform coefficient set; and perform dequantization on the first transform coefficient set according to the quantization adjustment factor to obtain a second transform coefficient set.

18. The apparatus of claim 17, wherein the processor is further configured to obtain temporal neighborhood pixel information of the image area or pixel information of the image area from the decoded pixel information.

19. The apparatus of claim 17, wherein the processor being configured to perform dequantization processing on the first transform coefficient set to obtain the second transform coefficient set comprises the processor being configured to:

determine, according to a preset first correspondence, a target level scaling list corresponding to the quantization adjustment factor, the first correspondence is between quantization adjustment factors and level scaling lists; and perform dequantization on the first transform coefficient set according to the target level scaling list to obtain the second transform coefficient set.

20. The apparatus of claim 17, wherein the processor being configured to perform dequantization processing on the first transform coefficient set to obtain the second transform coefficient set comprises the processor being configured to:

determine, according to a preset second correspondence, a target quantization matrix corresponding to the quantization adjustment factor, the second correspondence is between quantization adjustment factors and quantization matrices; and perform dequantization on the first transform coefficient set according to the target quantization matrix to obtain the second transform coefficient set.

* * * * *